No. 611,852. Patented Oct. 4, 1898.
J. R. WHITE.
TRIP MECHANISM FOR CARS.
(Application filed July 14, 1897.)
(No Model.) 2 Sheets—Sheet 2.
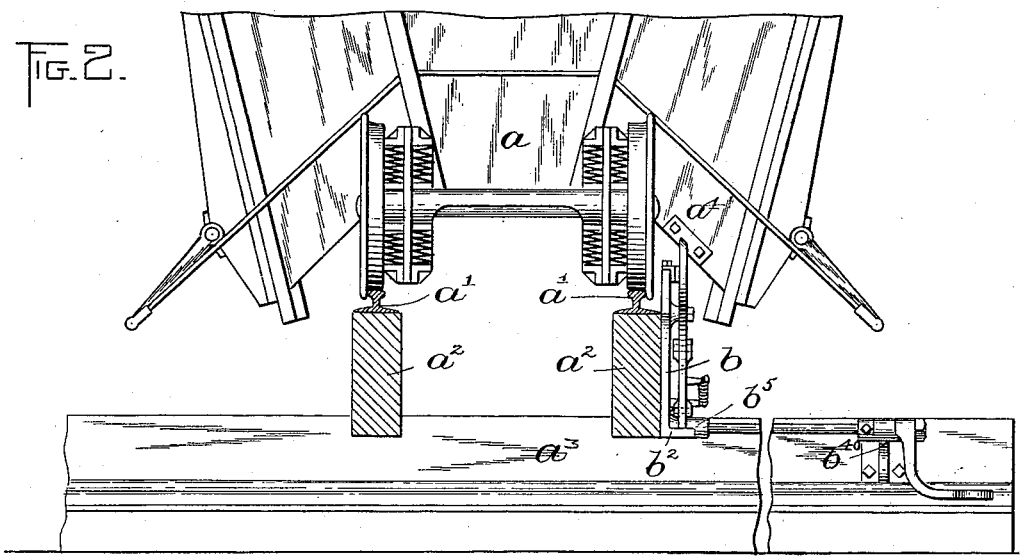
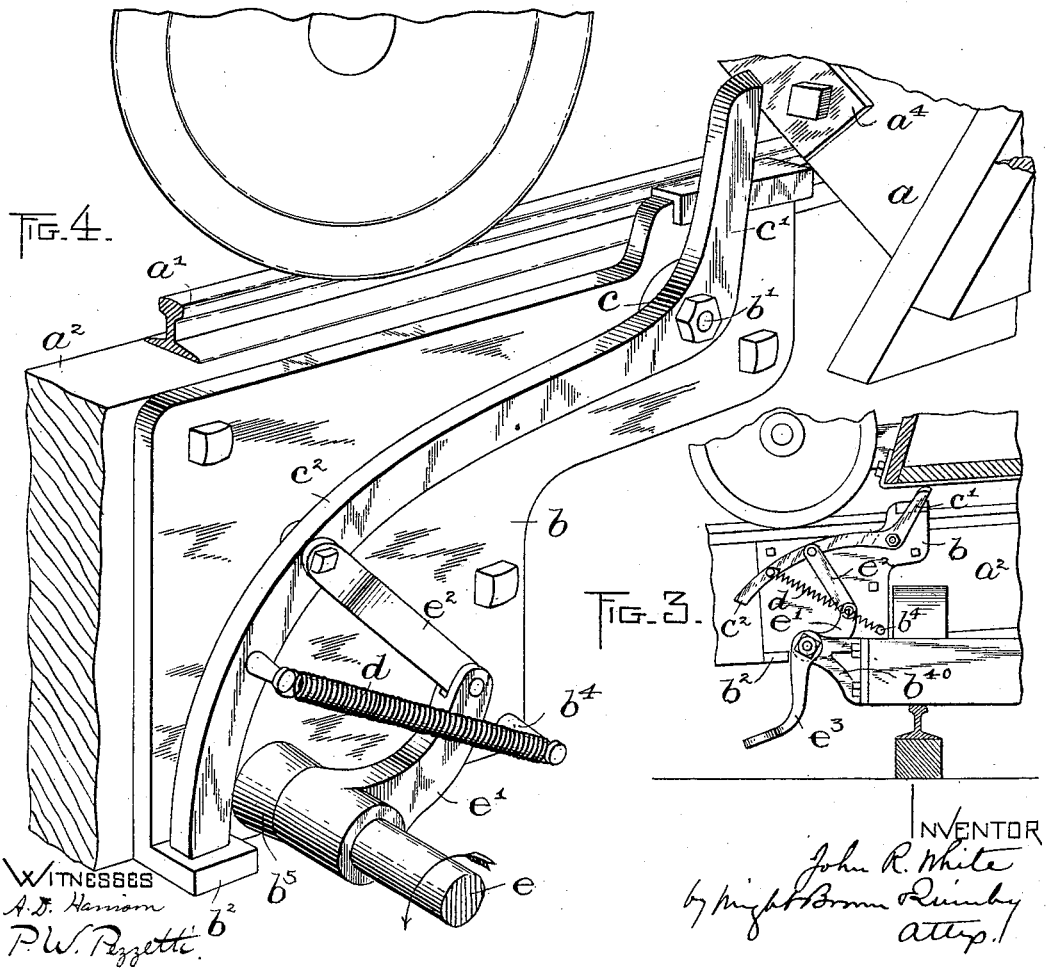

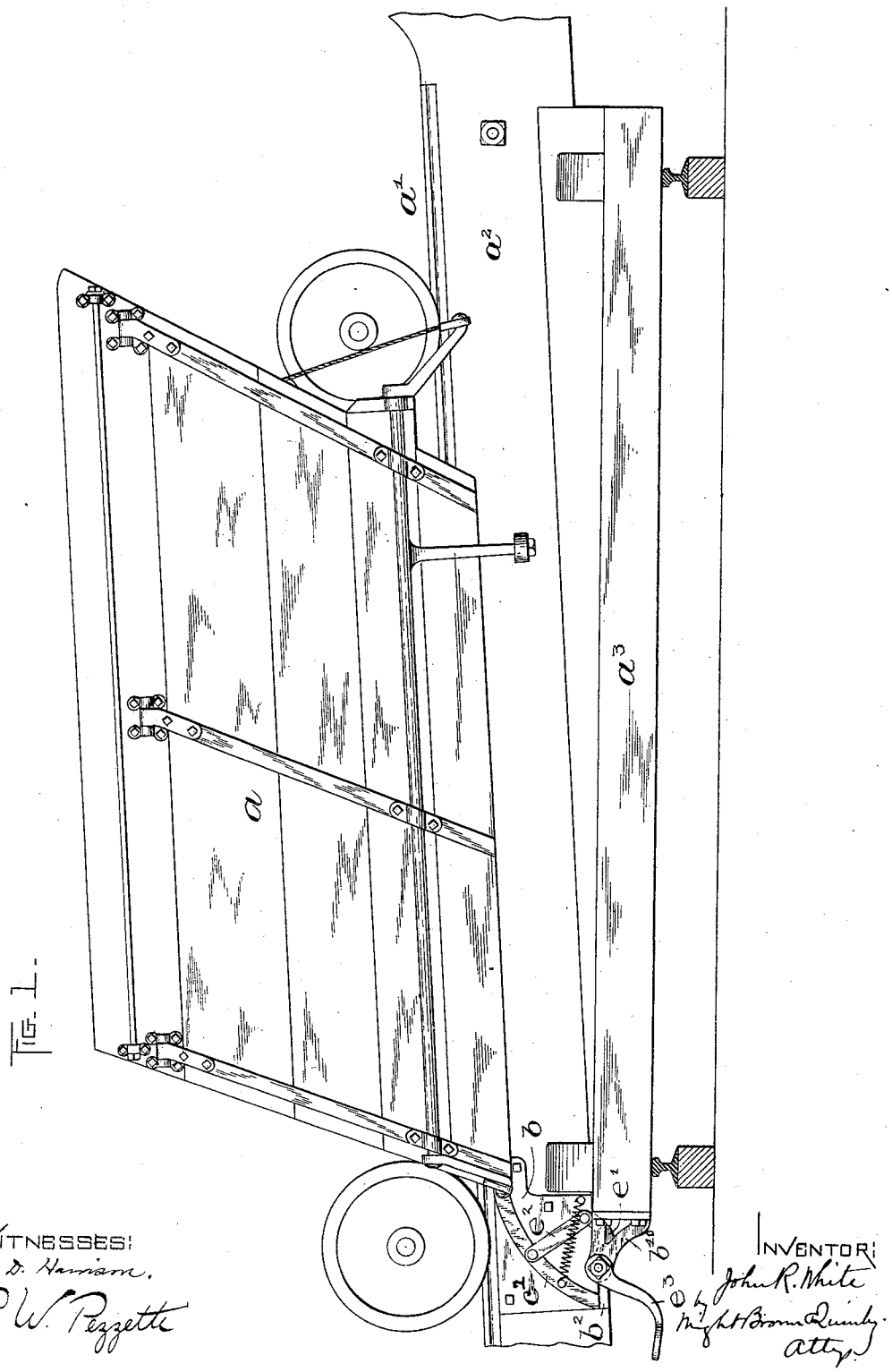

UNITED STATES PATENT OFFICE.

JOHN R. WHITE, OF BOSTON, MASSACHUSETTS.

TRIP MECHANISM FOR CARS.

SPECIFICATION forming part of Letters Patent No. 611,852, dated October 4, 1898.

Application filed July 14, 1897. Serial No. 644,501. (No model.)

*To all whom it may concern:*

Be it known that I, JOHN R. WHITE, of South Boston, in the county of Suffolk and State of Massachusetts, have invented certain new and useful Improvements in Trip Mechanism for Cars, of which the following is a specification.

This invention has relation to railways employed more particularly for loading and unloading vessels or transporting material in short distances from one place to another; and it has for its object to provide a trip mechanism for automatically locking a car against movement while it is being loaded or unloaded and which when operated will permit the car to pass freely along the track.

The invention consists of a trip mechanism adapted more particularly for use upon inclined tracks and automatically locking the car against movement, means being provided for operating the trip to release the car, all as I have illustrated upon the drawings and shall now proceed to describe in detail and then point out in the claims hereto appended.

Reference is to be had to the accompanying drawings and to the letters marked thereon, forming a part of this specification, the same letters designating the same parts or features, as the case may be, wherever they occur.

Of the drawings, Figure 1 represents, in side elevation, a car upon inclined tracks and held against movement by my improved trip. Fig. 2 represents an end view of the car and the trip. Fig. 3 illustrates the parts of the mechanism in position to release the car. Fig. 4 represents a perspective view of the trip, the car being broken away.

Referring to the drawings, $a$ indicates a car of the class employed for transporting coal or other material; but inasmuch as the invention relates not to the car but to the mechanism for holding it against movement I shall not describe the car more than to state that it may be any one of the numerous kinds employed for this purpose. The car runs on rails $a'$ $a'$, which are inclined and are supported upon beams $a^2$ $a^2$, resting upon the platform $a^3$. The tracks may be level nearly their entire length, but are inclined at their ends for a purpose to be described. On the side of one of the beams $a^2$ is bolted a plate $b$. Projecting out from the plate is a stud $b'$, (see Fig. 3,) on which is fulcrumed a trip-lever $c$, having its short arm $c'$ bent up so as to project above the tread of the rail at the side thereof. The long arm $c^2$ of the lever is curved downwardly and has its lower end resting upon a stop $b^3$, projecting out from the plate. A spring $d$ is connected to the arm $c^2$ and to a stud $b^4$ on the plate to assist in holding the end of the arm $c'$ above the rail and to return the lever to its normal position after being tilted.

When the car passes along the rails and up the incline, it passes over the trip-lever, which drops to allow it to pass and immediately springs up again so as to lie in the path of the car and prevent it from traveling back and down the incline. A buffer-plate $a^4$ is bolted to the end of the car to strike against the lever and prevent it from wearing the car.

To depress the trip-lever and allow the car by its gravity to pass down the incline, a rockshaft $e$ is journaled at one end in an annular flange or bearing $b^5$ on the plate $b$ and at its other end in a bearing afforded by a bracket $b^{40}$, secured to one of the timbers of the platform, and is provided with an arm $e'$, connected to the arm $c^2$ of the lever $c$ by a connecting rod or link $e^2$. A foot-lever $e^3$ is secured to the end of the shaft $e$, which when depressed rocks the shaft, and the latter in turn raises the arm $e'$, and consequently the lower end $c^2$ of the lever $c$, so as to depress the upper end $c'$ of said lever below the plate $a^4$ and allow the car to travel down the rails.

It will be seen that the arm $c^2$ of the lever is considerably longer than the arm $c'$. This, coupled with the fact that the treadle mechanism is connected directly to the long arm of the lever, enables the operator to easily release the car, which with its contents is frequently very heavy.

Thus from the foregoing it will be seen that I provide a mechanism which automatically locks the car against backward movement and which may be easily operated by an operator placing his foot upon the foot-lever $e^3$. Hence a single operator may release the car and start it toward the other end of the track with but little muscular exertion.

Having thus explained the nature of the invention and described a way of constructing and using the same, though without attempting to set forth all of the forms in which it may be made or all of the modes of its use, I declare that what I claim is—

1. A trip mechanism for cars comprising a lever fulcrumed between its ends and having one end longer than the other, the short end being arranged to engage a car, a stop, the long arm of said lever being at an angle to the short arm thereof and extending over the stop and adapted to normally rest thereon, a rock-shaft having an arm connected to the long arm of said lever, a treadle connected to said rock-shaft, and a spring connected to said lever for holding it yieldingly against said stop.

2. In combination, a plate having a projecting stop $b^2$, a stud $b'$, and a bearing $b^5$; a lever $c$ fulcrumed intermediate of its ends upon said stud and having one end resting upon said stop $b^2$, and the other projecting upward to engage a car; a rock-shaft $e$ having one end journaled in said bearing $b^5$, and formed with an arm $e'$; a treadle $e^3$ secured to said shaft to rock it; and a link $e^2$ connecting said arm $e'$ with said lever $c$, substantially for the purpose set forth.

In testimony whereof I have signed my name to this specification, in the presence of two subscribing witnesses, this 7th day of July, A. D. 1897.

JOHN R. WHITE.

Witnesses:
C. F. BROWN,
A. D. HARRISON.